[84.]

E. P. JONES & J. F. HARRELL.
Improvement in Cultivators.

No. 118,946.  Patented Sep. 12, 1871.

Witnesses:
Parker H. Sweet, Jr.
A. H. Norris.

Inventors:
E. P. Jones
J. F. Harrell.
By their Atty.
James L. Norris.

UNITED STATES PATENT OFFICE.

EZEKIEL PICKARD JONES AND JAMES LAFAYETTE HARRELL, OF HERTFORD, NORTH CAROLINA.

IMPROVEMENT IN CULTIVATORS.

Specification forming part of Letters Patent No. 118,946, dated September 12, 1871.

*To all whom it may concern:*

Be it known that we, EZEKIEL PICKARD JONES and JAMES LAFAYETTE HARRELL, of Hertford, in the county of Perquimans and State of North Carolina, have invented a new and Improved Scraper or Cutter Attachment for Plows; and we do hereby declare that the following is a full, clear, and exact description thereof, sufficient to enable others skilled in the art to which our invention appertains to make and use the same, reference being had to the accompanying drawing making part of this specification.

The object of our invention is to attach to the side of a plow a device through the medium and operation of which weeds and like substances on the surface of the ground may be more effectually eradicated and gathered from around growing plants than would result from the action of the plow alone; and to this end our invention consists of a bar of cast or wrought-iron, pivoted to a slotted bearing-plate which is attached to a cutter or scraper, so that the cutter can be adjusted to suit the different inclinations of the ground, all of which will be fully described hereafter.

Figure 1:
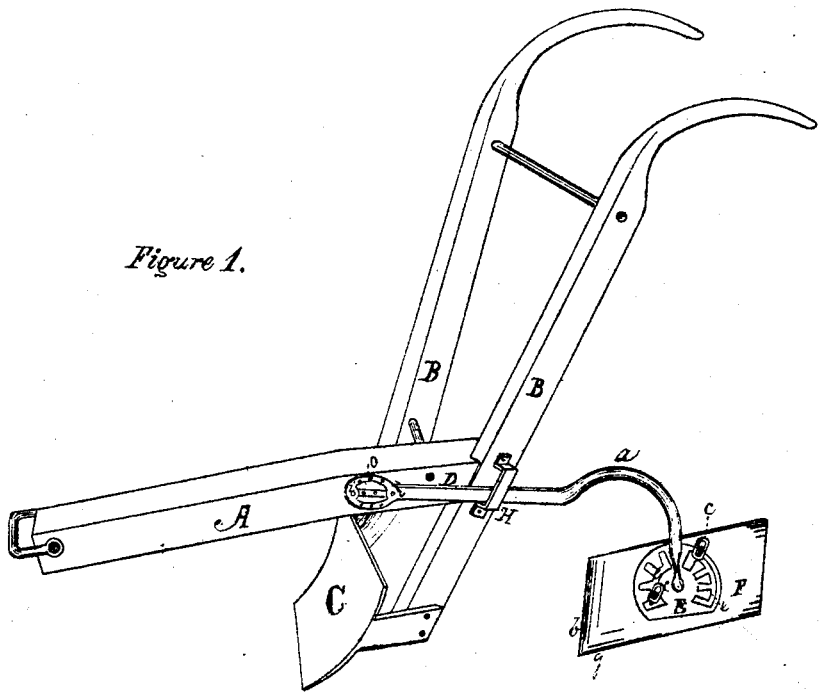
Figure 2:
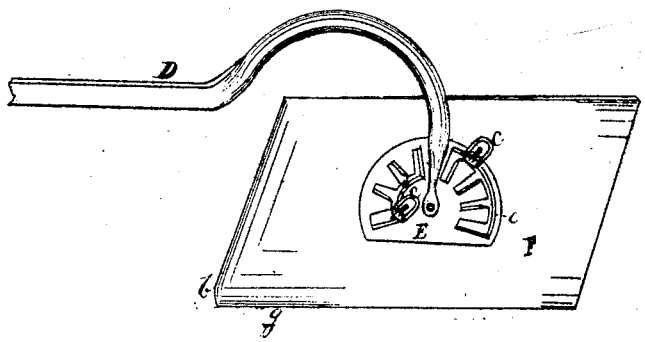

In the drawing, Figure 1 is a perspective view of an ordinary plow with our improvement attached thereto. Fig. 2 is a detached view of our improvement.

A designates the beam of the plow, B B the handles, and C the plow, all of which are constructed and united together in the ordinary manner and may be made of any suitable material. To the rear part of the plow-beam A, at or about the point $a$, is secured a metallic arm or lever, D, the same being bent or twisted outward at its opposite end so as to project from the rear and side of the plow-beam. The rear end of this arm D carries a supporting or bearing-plate, E, provided with a series of slots, in which work the bolts $c\ c$, the bolts $c\ c$ serving as a means of attachment of the cutter F to the plate or segment E. It will thus be seen that the scraper F can be readily adjusted to any inclination of the ground by simply bringing the bolts $c\ c$ in line with the curved slots $e\ e$ and then rotating or turning them to the desired inclination; then engaging the bolts with any one of the series of slots. The other end of the lever D is formed with a head, $o$, which is provided with a series of openings, $i$, and it is attached to the beam by a bolt and nut, so that it can be adjusted to any of the openings, and thus the cutter can be raised or depressed. F is the metallic cutter or scraper, formed of cast or wrought-iron, the edges $b\ g$ of the same being sharpened or formed with an edge and inclined inwardly, and is attached to the slotted segment E of the arm or lever D, as before described, so that the whole can be adjusted to any inclination, that, when the plow is in the proper position for plowing, the end of the cutter or scraper F shall rest upon the surface of the ground diagonally to the beam of the plow and at an angle to the furrows, a portion of the said scraper or cutter extending over the furrow last produced by the plow. H is a metallic loop or guide secured upon the handles, or, it may be, upon the beam, which allows a free motion up and down of the arm D, at the same time preventing displacement and receiving all lateral strain to which the same is subjected when in use.

This scraper or cutter is easily constructed, can be readily attached to any plow when it is desired to be used, or detached when it is only necessary to use the plow for cultivating.

By the use of the above scraper all weeds and stalks, &c., can be cut, gathered, or turned and drawn into the furrows as the plow advances, and will be completely embedded and laid beneath the soil.

Having thus described our invention, what we claim as new, and desire to secure by Letters Patent, is—

The scraper F, slotted plate E, bolts $c\ c$, bent lever D, head $o$, guide H, beam A, handles B B, and plow C, all constructed and arranged for operation, as herein shown and described.

To the above we have signed our names this 12th day of June, A. D. 1871.

EZEKIEL PICKARD JONES.
JAMES LAFAYETTE HARRELL.

Witnesses:
S. SINGLETON,
JAS. C. REUNER.

(84.)